United States Patent
Lestringant et al.

(10) Patent No.: US 10,307,992 B2
(45) Date of Patent: Jun. 4, 2019

(54) THIN LAMINATED GLASS

(71) Applicant: SAINT-GOBAIN GLASS FRANCE, Courbevoie (FR)

(72) Inventors: Claire Lestringant, Paris (FR); René Gy, Bondy (FR); Stephan Kremers, Heinsberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/031,380

(22) PCT Filed: Oct. 22, 2014

(86) PCT No.: PCT/FR2014/052684
§ 371 (c)(1),
(2) Date: Apr. 22, 2016

(87) PCT Pub. No.: WO2015/059406
PCT Pub. Date: Apr. 30, 2015

(65) Prior Publication Data
US 2016/0263969 A1   Sep. 15, 2016

(30) Foreign Application Priority Data
Oct. 23, 2013 (FR) .................................. 13 60325

(51) Int. Cl.
B32B 17/10 (2006.01)
B64C 1/14 (2006.01)
(Continued)

(52) U.S. Cl.
CPC ...... B32B 17/101 (2013.01); B32B 17/10036 (2013.01); B32B 17/10119 (2013.01);
(Continued)

(58) Field of Classification Search
CPC .................................................. B32B 17/10119
See application file for complete search history.

(56) References Cited

U.S. PATENT DOCUMENTS 3,445,316 A * 5/1969 Megles ................... C03C 21/00
                                                                264/2.6
3,558,415 A   1/1971 Rieser et al.
(Continued)

FOREIGN PATENT DOCUMENTS

DE   10 2004 022 008 A1   12/2004
DE   10 2009 025 972 A1   12/2010
(Continued)

OTHER PUBLICATIONS

Springer Handbook of Condensed Matter and Materials Data, 2005, p. 528; obtained from http://extras.springer.com/2005/978-3-540-44376-6/10678245/10678245-B-1.*
(Continued)

Primary Examiner — Z. Jim Yang
(74) Attorney, Agent, or Firm — Pillsbury Winthrop Shaw Pittman LLP

(57) ABSTRACT

A laminated glazing includes at least one outer glass sheet and a polymeric sheet, in which the outer glass sheet has a thickness of not more than 2 mm and a coefficient of thermal expansion of less than $70 \times 10^{-7}$ K$^{-1}$.

23 Claims, 1 Drawing Sheet

(51) Int. Cl.
*B60J 1/02* (2006.01)
*B60J 7/043* (2006.01)

(52) U.S. Cl.
CPC ........... *B32B 17/10761* (2013.01); *B60J 1/02* (2013.01); *B60J 7/043* (2013.01); *B64C 1/1484* (2013.01); *B64C 1/1492* (2013.01); *B32B 2307/30* (2013.01); *B32B 2605/006* (2013.01); *B32B 2605/18* (2013.01)

(56) References Cited

U.S. PATENT DOCUMENTS

| | | | | |
|---|---|---|---|---|
| 4,113,904 | A * | 9/1978 | Kiefer | B32B 17/10045 428/34 |
| 5,462,805 | A * | 10/1995 | Sakamoto | B32B 17/10 428/215 |
| 5,928,793 | A | 7/1999 | Kimura | |
| 2004/0028883 | A1 | 2/2004 | Straub et al. | |
| 2008/0197656 | A1* | 8/2008 | Fujimoto | B60J 1/02 296/84.1 |
| 2009/0297806 | A1* | 12/2009 | Dawson-Elli | B32B 17/10036 428/213 |
| 2009/0321005 | A1* | 12/2009 | Higuchi | B32B 7/06 156/249 |
| 2010/0015439 | A1* | 1/2010 | Buether | B32B 17/10036 428/337 |
| 2011/0088541 | A1* | 4/2011 | Pinckney | F41H 5/0407 89/36.02 |
| 2011/0261429 | A1* | 10/2011 | Sbar | B32B 17/10045 359/265 |
| 2012/0017975 | A1* | 1/2012 | Giron | B32B 17/10036 136/252 |
| 2012/0037229 | A1 | 2/2012 | Dawson-Elli et al. | |
| 2012/0128952 | A1* | 5/2012 | Miwa | B32B 17/10036 428/215 |
| 2012/0192928 | A1* | 8/2012 | Krol | B32B 17/10045 136/251 |
| 2012/0269995 | A1* | 10/2012 | Leighton | B32B 7/04 428/34 |
| 2012/0328843 | A1* | 12/2012 | Cleary | B32B 17/10036 428/174 |
| 2013/0258437 | A1* | 10/2013 | Sbar | B32B 17/10045 359/265 |
| 2014/0065374 | A1* | 3/2014 | Tsuchiya | C03B 23/0252 428/174 |
| 2014/0158201 | A1* | 6/2014 | Aitken | H01L 31/0488 136/259 |
| 2015/0064411 | A1* | 3/2015 | Sasai | B32B 17/10036 428/215 |
| 2015/0132584 | A1* | 5/2015 | Van Den Bergen | B32B 17/10045 428/213 |
| 2015/0140301 | A1* | 5/2015 | Fisher | B32B 17/10036 428/215 |
| 2015/0165730 | A1* | 6/2015 | Panzner | B32B 17/10045 428/213 |
| 2015/0174861 | A1* | 6/2015 | Hasegawa | B32B 17/10018 428/337 |
| 2015/0202854 | A1* | 7/2015 | Tsuchiya | C03C 3/087 428/179 |
| 2015/0258750 | A1* | 9/2015 | Kang | B32B 17/10018 428/174 |
| 2015/0329415 | A1* | 11/2015 | Bellman | B32B 7/06 428/141 |
| 2016/0136929 | A1* | 5/2016 | Meiss | C03C 21/002 428/213 |
| 2016/0250982 | A1* | 9/2016 | Fisher | B32B 17/06 428/215 |
| 2016/0280591 | A1* | 9/2016 | Cleary | B32B 17/10137 |

FOREIGN PATENT DOCUMENTS

| | | | |
|---|---|---|---|
| EP | 0 560 639 A2 | 9/1993 | |
| GB | 1 339 980 A | 12/1973 | |
| GB | 2078169 A * | 1/1982 | ....... B32B 17/10036 |
| JP | 2012-530026 | 11/2012 | |
| JP | 2013-067525 | 4/2013 | |
| JP | 2013067525 A2 † | 4/2013 | |
| WO | WO 2011/010067 A2 | 1/2011 | |
| WO | WO 2012/051038 A1 | 4/2012 | |
| WO | WO 2012/177426 A1 | 12/2012 | |

OTHER PUBLICATIONS

International Search Report as issued in International Patent Application No. PCT/FR2014/052684, dated Jan. 30, 2015.

\* cited by examiner
† cited by third party

THIN LAMINATED GLASS

CROSS-REFERENCE TO RELATED APPLICATIONS

This application is the U.S. National Stage of PCT/FR2014/052684, filed Oct. 22, 2014, which in turn claims priority to French Application No. 1360325, filed Oct. 23, 2013. The contents of all of these applications are incorporated herein by reference in their entirety.

The present invention relates to a thin laminated glazing that is resistant to projections of gravel, and to the use thereof in the motor vehicle or aeronautical sector, for example as a car windshield or sunroof.

Laminated glazings are commonly used in the motor vehicle, aeronautical or building sector, since they have the advantage of being "safety" glazings. They consist of two sheets of glass linked together by an insert layer made of plastic, generally of polyvinyl butyral (PVB). To improve the mechanical strength of this type of glazing, it is known practice to reinforce the constituent glass sheets by tempering them and thus creating a surface zone in compression and a central zone in tension, as described, for example, in patent EP 0 560 639. U.S. Pat. No. 3,558,415 describes a bent laminated glazing in which the outer and inner glass sheets have been chemically tempered so as to have a surface zone in compression. Patent GB 1 339 980 describes a windshield glazing in which only the outer glass sheet is chemically tempered.

A problem encountered in the motor vehicle sector relates to the weight of the glazings. It is currently sought to reduce the weight of glazings, without, however, compromising the mechanical strength properties. Patent applications WO 2012/051 038 and WO 2012/177 426 describe laminated glasses in which the glass sheets have a thickness of less than 2 mm and at least one of the glass sheets is chemically tempered. The reduction in thickness of the constituent glass sheets of a windshield allows its weight to be reduced but may give rise to mechanical problems, especially an increase in its fragility when it is exposed to projections of gravel. The solution proposed by the documents cited above consists in chemically tempering the outer glass sheet. The process of chemical tempering, or ionic exchange, consists of the surface replacement of an ion of the glass sheet (generally an ion of an alkali metal such as sodium) with an ion of larger ionic radius (generally an ion of an alkali metal such as potassium) and in creating residual compression stresses at the surface of the sheet, down to a certain depth. This is a relatively expensive and long process and is consequently poorly compatible with a continuous industrial process.

It would be useful, for reasons of cost, weight and simplification of the technology, to have available a thin laminated glass whose mechanical strength is compatible with the intended applications, and which consists of glass sheets that are not necessarily reinforced.

The present invention falls within this context, the subject being a laminated glazing that is resistant to projections of gravel, which comprises at least one outer glass sheet and a polymeric sheet, in which the outer glass sheet has a thickness of not more than 2 mm and a coefficient of thermal expansion of less than $70 \times 10^{-7}$ $K^{-1}$.

In the present invention, the term "outer" is used for everything relating to the exterior of the device receiving the glazing. The outer glass sheet is consequently that which is positioned facing the exterior of the cockpit. Conversely, the term "inner" is used for that relating to the interior of the device receiving the glazing. An inner sheet of a laminated glazing corresponds to the sheet that is placed facing the interior of the cockpit.

The inventors have demonstrated that by preparing a laminated glazing with a glass sheet whose coefficient of thermal expansion is low, i.e. less than $70 \times 10^{-7}$ $K^{-1}$, the mechanical strength is satisfactory and especially compatible with use of the glazing as a motor vehicle windshield or sunroof, despite the absence of mechanical reinforcement. An important consequence for the final product is especially its lightened weight, leading to lightening of the weight of the vehicle and reduced consumption.

The outer glass sheet preferably has a thickness of not more than 1.6 mm or even not more than 1.1 mm. Thus, this relatively low thickness of the outer sheet contributes toward lightening the weight of the laminated glazing.

Preferentially, the outer glass sheet has a coefficient of thermal expansion of less than $50 \times 10^{-7}$ $K^{-1}$.

According to a preferred embodiment, the outer glass sheet has a chemical composition of borosilicate type. It may be such that its chemical composition comprises the following oxides in the weight content ranges defined below:

| | |
|---|---|
| $SiO_2$ | 75-85%, |
| $Al_2O_3$ | 2-3%, |
| $B_2O_3$ | 10-15%, |
| $Na_2O + K_2O$ | 3-7%. |

The outer glass sheet may also be such that its chemical composition comprises the following oxides in the weight content ranges defined below:

| | |
|---|---|
| $SiO_2$ | 60-65%, |
| $Al_2O_3$ | 13-18%, |
| $B_2O_3$ | 8-14%, |
| $CaO + MgO + SrO$ | 6-10%. |

According to another embodiment, the outer glass sheet has a chemical composition of lithium aluminosilicate type. It is such that its chemical composition comprises the following oxides in the weight content ranges defined below:

| | |
|---|---|
| $SiO_2$ | 52-75%, |
| $Al_2O_3$ | 15-27%, |
| $Li_2O$ | 2-10%, |
| $Na_2O$ | 0-1%, |
| $K_2O$ | 0-5%, |
| $CaO$ | 0-0.5%, |
| $ZnO$ | 0-5%, |
| $MgO$ | 0-5%, |
| $BaO$ | 0-5%, |
| $SrO$ | 0-3%, |
| $TiO_2$ | 0-6%, |
| $ZrO_2$ | 0-3%, |
| $P_2O_5$ | 0-8%. |

The glass compositions above mention only the essential constituents. They do not give the minor elements of the composition, for instance the conventionally used refining agents such as arsenic, antimony, tin and cerium oxides, metal halides or sulfides or coloring agents, especially such as iron oxides, in particular cobalt, chromium, copper, vanadium, nickel and selenium oxides, which are most often necessary for glass applications in motor vehicle glazing.

According to one embodiment, the glazing according to the invention also comprises at least one inner glass sheet.

In this case, the polymeric sheet is located between the two glass sheets and is thus an insert sheet.

In this embodiment comprising two glass sheets and a polymeric sheet located between the two glass sheets, the inner sheet of the laminated glazing has a thickness of not more than 1.5 mm. Preferentially, this inner sheet has a thickness of not more than 1.1 mm, or even is less than 1 mm. Advantageously, the inner glass sheet has a thickness of less than or equal to 0.7 mm. The thickness of the inner glass sheet is at least 50 µm.

The inner glass sheet is preferentially thinner than the outer glass sheet.

According to a preferred embodiment, the constituent sheets of the glazing are not reinforced. The glass sheets are neither chemically nor thermally tempered. As they are not chemically reinforced, the sheets normally do not contain an overconcentration of an oxide of an alkali metal such as Na or K at the surface relative to the core. Nevertheless, there may be stresses, advantageously compression stresses, in the glass sheet which would result from the assembly with the polymeric sheet.

It is, however, possible, if the user so desires and should the glass so permit, to chemically reinforce the glass sheets by tempering.

The polymeric sheet may consist of one or more layers of thermoplastic material. It may especially be made of polyurethane, polycarbonate, polyvinyl butyral (PVB), polymethyl methacrylate (PMMA), ethylene-vinyl acetate (EVA) or ionomeric resin. The polymeric sheet may be in the form of a multilayer film with particular functionalities, for instance better acoustic properties, anti-UV properties, etc. It may also support one or more functional thin layers: certain layers may have scratch-resistance properties against accidental attack, and others may have driving properties for giving the glazings antisun, demisting and/or deicing functions.

The thickness of the polymeric sheet is between 50 µm and 4 mm. When the glass sheets are very thin and have a thickness of less than 1 mm, it may be advantageous to use a polymeric sheet with a thickness of greater than 1 mm, or even greater than 2 or 3 mm, to give the glazing rigidity, without resulting in an excessive weight increase of the structure.

When the laminated glazing comprises two glass sheets and the polymeric sheet or insert, the thickness of the insert is generally less than 1 mm. Conventionally, the insert comprises at least one layer of PVB. In motor vehicle glazings, the thickness of the polymeric insert is generally 0.76 mm.

The laminated glazing according to the present invention is considered as being thin since it has a total thickness of less than 4.5 mm, and even preferentially less than 4 mm. It has better mechanical strength than the laminated glazings considered as being thin and known in the prior art. The durability of the glazing is also improved, especially after damage by projection of gravel. The risks of breakage during the application of heat gradients on embrittled glazings, especially, for example, during the deicing of a windshield, are also reduced.

The laminated glazing according to the present invention advantageously constitutes a motor vehicle glazing and especially a windshield or a sunroof. It may also constitute a glazing in the aeronautical sector, and especially for helicopters. The constituent sheet(s) of the laminated glazing are advantageously bent before being assembled with the polymeric insert to form the finished product.

The glazing according to the invention has the advantage of being able to be used in applications in which it is exposed to projections of gravel.

In order to compare the resistance of different laminated glazings to projections of gravel, an indentation test, called "Sarbacance test" is performed. This test consists in releasing a weighted (3.2 g weight) Vickers diamond indenter on the outer face of a plate of laminated glazing 200×200 mm in size, held in a flexible rubber frame, from different heights of between 100 and 2000 mm. The flexible frame allows the laminated glazing to become deformed during the impact of the indenter. The drop height until a star-shaped crack is visible on inspection with a microscope, or whose maximum size exceeds 10 mm, after impact on the outer glass sheet (impact depth of between 100 and 150 µm) is thus measured. The height is increased by 100 mm between each drop of the indenter and the first height at which the crack is observed is noted. Each laminated glazing is tested at nine different points of impact. The drop height value given in the examples below corresponds to the mean of the nine fracture height values. The detection of the crack takes place immediately after dropping the Vickers indenter.

The examples below illustrate the invention without limiting its scope.

The indentation test (<<Sarbacane<<test) is performed on four different thin laminated glasses consisting of:
- an inner glass sheet of silicon-sodium-calcium type, of composition C1 given in Table 1 below (ordinary transparent clear glass),
- a standard polymeric insert made of PVB with a thickness of 0.76 mm,
- an outer glass sheet of composition C2 to C5 given in Table 1 below.

Composition C1 is a silicon-sodium-calcium glass. Compositions C2 to C4 make it possible to obtain laminated glazings according to the present invention. Compositions C2 and C3 are glasses of borosilicate type. Composition C4 is a glass of lithium aluminosilicate type.

Composition C5 is a glass of sodium aluminosilicate type, given for comparative purposes.

TABLE 1

| | composition of the glasses | | | | |
|---|---|---|---|---|---|
| weight % | C1 | C2 | C3 | C4 | C5 |
| $SiO_2$ | 71.1 | 80.5 | 63.6 | 68.2 | 60.7 |
| $Al_2O_3$ | 0.65 | 2.5 | 16 | 18.95 | 7.7 |
| $B_2O_3$ | | 12.95 | 10.7 | | |
| $Na_2O$ | 13.8 | 3.42 | | | 13.1 |
| $K_2O$ | 0.25 | 0.63 | | | 9.55 |
| $Li_2O$ | | | | 3.45 | |
| CaO | 8.75 | | 7.8 | | |
| MgO | 4 | | 0.1 | 1.2 | 8.4 |
| SrO | | | 0.7 | | |
| ZnO | | | | 1.62 | |
| $TiO_2$ | | | | 2.58 | |
| $ZrO_2$ | | | | 1.68 | |

The coefficients of thermal expansion of the glasses of compositions C1 to C5 are given in Table 2.

|  | C1 | C2 | C3 | C4 | C5 |
|---|---|---|---|---|---|
| CTE ($10^{-7}$/K) | 89 | 32 | 32 | 41 | 108 |

The outer glass sheet is the sheet directly subjected to the impact of the diamond-tipped indenter.
The first height at which a crack appears on the outer sheet is measured for each laminated glazing tested.

EXAMPLE 1

Figure 1:
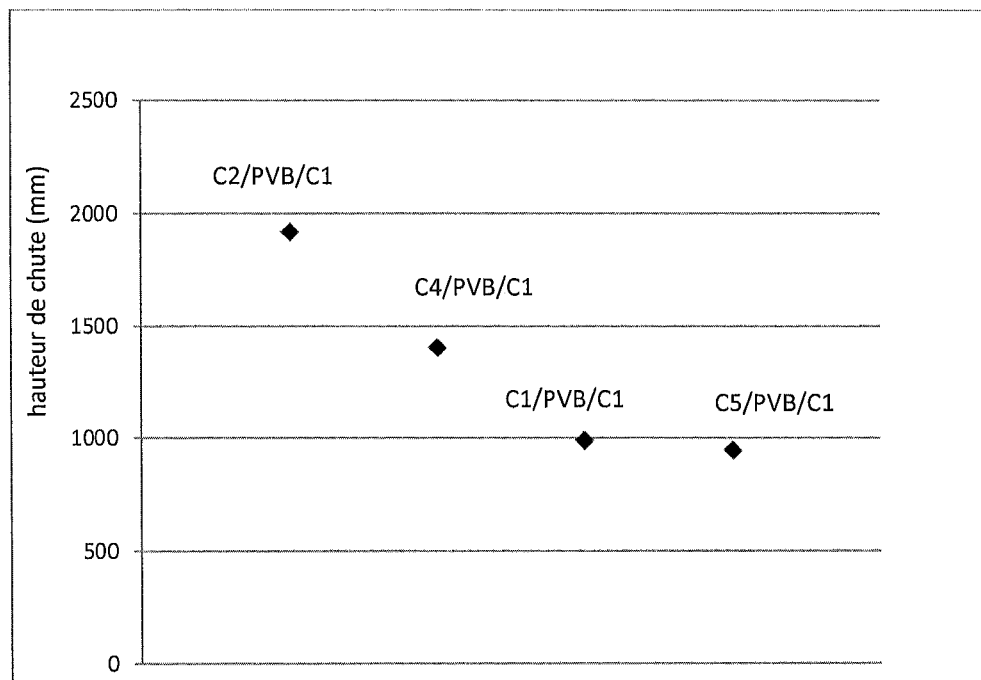
FIG. 1 shows the results of the indentation test ("Sarbacane test") for various laminated glasses according to Example 1.

Laminated glasses consisting of an inner glass sheet of composition C1 0.55 mm thick, a standard PVB insert 0.76 mm thick and outer glass sheets of composition C1, C2, C4 and C5 1.1 mm thick are subjected to the indentation test ("Sarbacane" test). The results are given in FIG. 1 in which is shown the drop height of the Vickers indenter at which the first star-shaped cracks appear according to the indentation test described previously. The laminated glazings tested are noted in the following manner: composition of the outer glass sheet/nature of the polymeric sheet/composition of the inner glass sheet. Thus, the laminated glazing C2/PVB/C1 corresponds to an outer sheet made of glass of borosilicate type of composition C2, a PVB insert and an inner sheet made of silicon-sodium-calcium glass of composition C1.

The laminated glazings C1/PVB/C1 and C5/PVB/C1 are not in accordance with the invention and are given for comparative purposes.

It is noted that the glazings according to the invention are those that have the best mechanical strengths.

EXAMPLE 2

Figure 2:
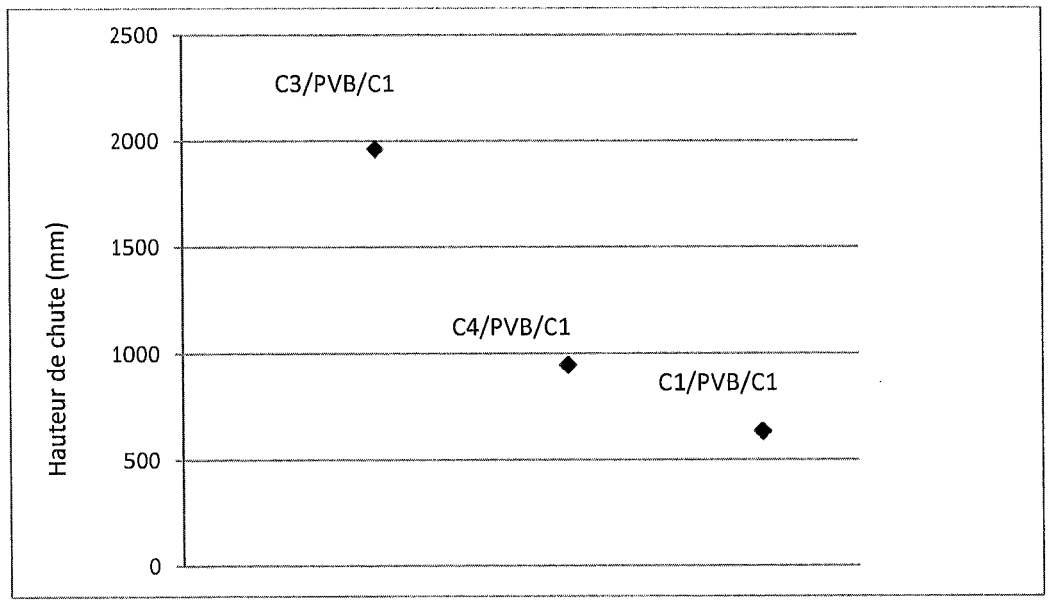
FIG. 2 shows the results of the indentation test ("Sarbacane test") for various laminated glasses according to Example 2.

Laminated glasses consisting of an inner glass sheet of composition C1 0.7 mm thick, a standard PVB insert 0.76 mm thick and glass sheets of composition C1, C3 and C4 0.7 mm thick are subjected to the indentation test. The test results are given in FIG. 2.

The laminated glazing C1/PVB/C1 is not in accordance with the invention and is given for comparative purposes.

It is noted that the laminated glazing C3/PVB/C1 according to the invention has very good mechanical strength, despite a low sheet thickness (the total thickness of the laminated glazing is 2.16 mm).

The invention claimed is:

1. A laminated windshield of a vehicle, the laminated windshield being resistant to projections of gravel and comprising:
   at least one outer glass sheet for facing an exterior of the vehicle,
   at least one inner glass sheet for facing an interior of the vehicle, the inner glass sheet having a thickness of not more than 1.1 mm, and
   a polymeric sheet located between the inner and outer glass sheets,
      wherein the inner glass sheet is thinner than the outer glass sheet,
      wherein the outer glass sheet has a thickness of not more than 1.6 mm and a coefficient of thermal expansion of less than $50 \times 10^{-7}$ $K^{-1}$,
      wherein the inner glass sheet has a chemical composition of a soda-lime glass, and
      wherein the laminated windshield is a bent windshield for being mounted to the vehicle such that the inner glass sheet is more proximal to the interior of the vehicle than the outer glass sheet is, and
      wherein the polymeric sheet has a thickness from 500 µm to 4 mm.

2. The laminated windshield as claimed in claim 1, wherein the outer glass sheet has a chemical composition of a borosilicate glass.

3. The laminated windshield as claimed in claim 2, wherein the outer glass sheet comprises

| $SiO_2$ | 75-85%, |
|---|---|
| $Al_2O_3$ | 2-3%, |
| $B_2O_3$ | 10-15%, |
| $Na_2O + K_2O$ | 3-7%. |

4. The laminated windshield as claimed in claim 2, wherein the outer glass sheet comprises

| $SiO_2$ | 60-65%, |
|---|---|
| $Al_2O_3$ | 13-18%, |
| $B_2O_3$ | 8-14%, |
| $CaO + MgO + SrO$ | 6-10%. |

5. The laminated windshield as claimed in claim 1, wherein the outer glass sheet has a chemical composition of a lithium aluminosilicate glass and comprises

| $SiO_2$ | 52-75%, |
|---|---|
| $Al_2O_3$ | 15-27%, |
| $Li_2O$ | 2-10%, |
| $Na_2O$ | 0-1%, |
| $K_2O$ | 0-5%, |
| $CaO$ | 0-0.5%, |
| $ZnO$ | 0-5%, |
| $MgO$ | 0-5%, |
| $BaO$ | 0-5%, |
| $SrO$ | 0-3%, |
| $TiO_2$ | 0-6%, |
| $ZrO_2$ | 0-3%, |
| $P_2O_5$ | 0-8%. |

6. The laminated windshield as claimed in claim 1, wherein the polymeric sheet comprises one or more layers of thermoplastic material chosen from polyurethane, polycarbonate, polyvinyl butyral (PVB), polymethyl methacrylate (PMMA) and ethylene-vinyl acetate (EVA) or an ionomeric resin.

7. The laminated windshield as claimed in claim 1, wherein the polymeric sheet comprises at least one layer of PVB.

8. The laminated windshield as claimed in claim 1, wherein the outer glass sheet is a sheet that is not chemically or thermally reinforced.

9. The laminated windshield as claimed in claim 1, wherein the laminated windshield constitutes a motor vehicle laminated windshield.

10. The laminated windshield as claimed in claim 1, wherein the laminated windshield constitutes a laminated windshield for helicopters.

11. The laminated windshield as claimed in claim 1, wherein the inner glass sheet has a thickness of less than 1 mm.

12. The laminated windshield as claimed 1, wherein the outer glass sheet has a thickness of not more than 1.1 mm.

13. The laminated windshield as claim 1, wherein a total thickness of the inner glass sheet, the outer glass sheet and the polymeric sheet is less than 4.5 mm.

14. The laminated windshield as claim 13, wherein a total thickness of the inner glass sheet, the outer glass sheet and the polymeric sheet is less than 4 mm.

15. The glazing as claimed in claim 1, wherein the polymeric sheet has a thickness from 760 μm to 4 mm.

16. A bent laminated windshield of a vehicle, the bent laminated windshield being resistant to projections of gravel and comprising:
   at least one bent outer glass sheet with a convex outer surface for facing an exterior of the vehicle,
   at least one bent inner glass sheet with a concave inner surface for facing an interior of the vehicle, the bent inner glass sheet having a thickness of not more than 1.1 mm, and
   a polymeric sheet located between the inner and outer glass sheets,
      wherein the bent inner glass sheet is thinner than the bent outer glass sheet,
      wherein the bent outer glass sheet has a thickness of not more than 1.6 mm and a coefficient of thermal expansion of less than $50 \times 10^{-7}$ $K^{-1}$,
      wherein the bent inner glass sheet has a chemical composition of a soda-lime glass,
      wherein the bent laminated windshield is for being mounted to the vehicle such that the bent inner glass sheet is more proximal to the interior of the vehicle than the bent outer glass sheet is, and
      wherein the polymeric sheet has a thickness from 500 μm to 4 mm.

17. The bent laminated windshield as claimed in claim 16, wherein the bent outer glass sheet has a chemical composition of a borosilicate glass.

18. The bent laminated windshield as claimed in claim 17, wherein the bent outer glass sheet comprises

| | |
|---|---|
| $SiO_2$ | 75-85%, |
| $Al_2O_3$ | 2-3%, |
| $B_2O_3$ | 10-15%, |
| $Na_2O + K_2O$ | 3-7%. |

19. The bent laminated windshield as claimed in claim 16, wherein the polymeric sheet has a thickness from 760 μm to 4 mm.

20. A vehicle comprising a bent laminated windshield, the bent laminated windshield being resistant to projections of gravel and comprising:
   at least one outer glass sheet for facing an exterior of the vehicle,
   at least one inner glass sheet for facing an interior of the vehicle, the inner glass sheet having a thickness of not more than 1.1 mm, and
   a polymeric sheet located between the inner and outer glass sheets,
      wherein the inner glass sheet is thinner than the outer glass sheet,
      wherein the outer glass sheet has a thickness of not more than 1.6 mm and a coefficient of thermal expansion of less than $50 \times 10^{-7}$ $K^{-1}$,
      wherein the inner glass sheet has a chemical composition of a soda-lime glass,
      wherein the bent laminated windshield is mounted to the vehicle such that the inner glass sheet is more proximal to the interior of the vehicle than the outer glass sheet is, and
      wherein the polymeric sheet has a thickness from 500 μm to 4 mm.

21. The vehicle as claimed in claim 20, wherein the outer glass sheet has a chemical composition of a borosilicate glass.

22. The vehicle as claimed in claim 21, wherein the outer glass sheet comprises

| | |
|---|---|
| $SiO_2$ | 75-85%, |
| $Al_2O_3$ | 2-3%, |
| $B_2O_3$ | 10-15%, |
| $Na_2O + K_2O$ | 3-7%. |

23. The vehicle as claimed in claim 20, wherein the polymeric sheet has a thickness from 760 μm to 4 mm.

* * * * *